United States Patent [19]
Fuller

[11] Patent Number: 6,110,613
[45] Date of Patent: Aug. 29, 2000

[54] ALCOHOL AND WATER RECOVERY SYSTEM FOR A DIRECT AQUEOUS ALCOHOL FUEL CELL POWER PLANT

[75] Inventor: Thomas F. Fuller, Glastonbury, Conn.

[73] Assignee: International Fuel Cells Corporation, South Windsor, Conn.

[21] Appl. No.: 09/121,500

[22] Filed: Jul. 23, 1998

[51] Int. Cl.[7] .................................................. H01M 8/04
[52] U.S. Cl. ............................... 429/17; 429/19; 429/13; 429/30; 210/502.1
[58] Field of Search .................................. 429/17, 19, 13, 429/30; 210/483, 502.1

[56] References Cited

U.S. PATENT DOCUMENTS

| 4,849,311 | 7/1989 | Itoh et al. ............................... 429/192 |
| 5,635,041 | 6/1997 | Bahar et al. ............................. 204/282 |
| 5,779,904 | 7/1998 | Ruderman et al. ................. 210/500.25 |
| 5,837,393 | 11/1998 | Okamoto ................................... 429/20 |
| 5,853,909 | 12/1998 | Reiser ........................................ 429/13 |

OTHER PUBLICATIONS

PCT International Application No. WO99/05741 Published Feb. 4, 1999.
Printed Article Entitled "Feasibility Study of SPE Fuel Cell Power Plants for Automotive Applications", Written on Nov. 17, 1981 by General Electric Corporation, Direct Energy Conversion Programs, 50 Fordham Rd., Wilmington, MA 01887, (See, Figs. 1, 16, 28, and pp. 58–60).

Primary Examiner—Maria Nuzzolillo
Assistant Examiner—Ray Alejandro
Attorney, Agent, or Firm—Malcolm J. Chisholm, Jr.

[57] ABSTRACT

An alcohol and water recovery system for a direct aqueous alcohol fuel cell power plant includes at least one direct aqueous alcohol fuel cell for producing electrical energy, and a direct alcohol and water transfer device for recovering alcohol and water leaving the plant and transferring the recovered alcohol and water back into the plant. The direct alcohol and water transfer device passes a process oxidant stream upstream of the plant in mass transfer relationship with a plant exhaust stream that includes aqueous alcohol fuel and process oxidant fluid streams that have passed through the fuel cell, so that alcohol and water in the plant exhaust stream transfer directly through a mass transfer medium of the device to the process oxidant stream entering the fuel cell. The device includes a separator housing for supporting the transfer medium and for preventing bulk mixing of the streams. An exemplary mass transfer medium such as a liquid water portion of a water saturated polyfluorosulfonic ionomer selectively sorbs fluid substances consisting of polar molecules such as alcohol and/or water molecules from the plant exhaust stream containing polar and non-polar molecules, and desorbs the polar molecules into the process oxidant stream to directly recover and transfer alcohol fuel and water leaving the plant back into the fuel cell, and to thereby also humidify and add heat to the process oxidant stream.

16 Claims, 2 Drawing Sheets

ALCOHOL AND WATER RECOVERY SYSTEM FOR A DIRECT AQUEOUS ALCOHOL FUEL CELL POWER PLANT

TECHNICAL FIELD

The present invention relates to fuel cell power plants that are suited for usage in transportation vehicles, portable power plants, or as stationary power plants, and the invention especially relates to a fuel cell power plant that utilizes an aqueous alcohol solution or mixture as a fuel and recovers unused alcohol and water exiting the plant and transfers the alcohol and water back into the plant.

BACKGROUND OF THE INVENTION

Fuel cell power plants are well-known and are commonly used to produce electrical energy from reducing and oxidizing fluids to power electrical apparatus such as apparatus on-board space vehicles. In such power plants, a plurality of planar fuel cells are typically arranged in a stack surrounded by an electrically insulating frame structure that defines manifolds for directing flow of reducing, oxidant, coolant and product fluids. Each individual cell generally includes an anode electrode and a cathode electrode separated by an electrolyte. A fuel such as hydrogen or methanol is supplied to the anode electrode, and an oxidant such as oxygen or air is supplied to the cathode electrode. In a cell utilizing a proton exchange membrane as the electrolyte, the fuel electrochemically reacts at a surface of the anode electrode to produce hydrogen ions and electrons, and carbon dioxide if the fuel is methanol. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is a proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention. As is well-known however, PEM cells have significant limitations especially related to liquid water transport to, through and away from the PEM, and related to simultaneous transport of gaseous reducing and oxidant fluids to and from the electrodes adjacent opposed surfaces of the PEM. The prior art includes many efforts to minimize the effect of those limitations.

In operation of a fuel cell employing a PEM, the membrane is saturated with water, and the anode electrode adjacent the membrane must remain wet. As hydrogen ions produced at the anode electrode transfer through the electrolyte, they drag water molecules in the form of hydronium ions with them from the anode to the cathode. Water also transfers back to the anode from the cathode by osmosis. Product water formed at the cathode electrode is removed by evaporation or entrainment into a circulating gaseous stream of oxidant, or by capillary action into and through a porous fluid transport layer adjacent the cathode.

It is known to utilize an aqueous alcohol solution or mixture as a fuel for fuel cells having PEM electrolytes, such as an aqueous methanol fuel. For purposes herein, the phrase "aqueous alcohol" is to be understood to mean a solution or mixture including water and methanol, ethanol, propanol, butanol or pentanol or combinations thereof. An advantage of an aqueous alcohol fuel is that a risk of drying out of the PEM adjacent the anode electrode is virtually eliminated because a liquid mixture of alcohol and water is supplied directly to the anode electrode. Another advantage is that, by directly oxidizing the alcohol at the anode electrode, there is no need for fuel processing components that are normally used in association with fuel cells to process organic fuels into hydrogen rich fuel streams. As disclosed in U.S. Pat. No. 5,573,866 issued on Nov. 12, 1996 to Van Dine et al. and assigned to the assignee of the invention disclosed herein, which patent is hereby incorporated herein by reference, direct aqueous alcohol fueled fuel cells may be supplied with a solution containing between about 1% to about 65% alcohol by weight with the remainder of the solution being water.

Direct aqueous alcohol fuel cells include at least two fuel cell configurations that utilize aqueous alcohol as a fuel source that is directly exposed to an anode electrode within the cell. For purposes of consistency herein, a first type of direct aqueous alcohol fuel cell will be characterized as a split reactant fuel cell, such as the fuel cell described in the aforesaid U.S. Pat. No. 5,573,866 to Van Dine et al. A second type of direct aqueous alcohol fuel cell will be characterized for purposes herein as a mixed reactant fuel cell.

In a split reactant fuel cell, an aqueous alcohol fuel and gaseous oxidant reactants are separated. The aqueous alcohol fuel is directed into contact exclusively with an anode electrode, while the oxidant is directed into contact with the cathode electrode. Typically the aqueous alcohol fuel is passed through carbon plates that have transverse grooves adjacent the anode electrode, or through porous plates adjacent the anode electrode while the gaseous stream of oxidant passes through porous or grooved plates adjacent the cathode electrode to supply oxidant to the cathode and to sweep away by evaporation and/or entrainment water formed at the cathode and any cooling water directed to the cathode electrode. The water formed at the cathode electrode and the cooling water may also be moved away from the electrode by capillary action into and through a porous fluid transport layer adjacent the cathode in a manner well-known in the art.

In a mixed reactant fuel cell, an aqueous alcohol fuel is mixed with a gaseous oxidant stream such as air and the alcohol, water and air are simultaneously directed past both the anode and cathode electrode. In such a mixed reactant fuel cell, the anode and cathode electrode configurations are fabricated to favor oxidation of the fuel at the anode electrode and reduction of the oxidant at the cathode electrode in a manner well-known in the art. Examples of mixed reactant fuel cells are disclosed in an article written by C. K. Dyer, entitled "A Novel Thin-Film Electrochemical Device for Energy Conversion" and in an article written by T. E. Mallouk entitled "Miniaturized Electrochemistry", both articles being published in "NATURE—International Weekly Journal of Science", Vol. 343, No. 6258, dated Feb. 8, 1990 at Pages 547 and 515 respectively, which articles are hereby incorporated herein by reference.

Both split and mixed reactant types of direct aqueous alcohol fuel cells suffer from major problems related to aqueous alcohol being adjacent the cathode electrodes. Split reactant fuel cells experience alcohol cross-over through the PEM electrolyte. Known PEM electrolytes are permeable to both water and alcohol, and consequently some alcohol crosses over from the anode side to emerge adjacent the cathode electrode to be swept out of the fuel cell in a cathode exhaust stream along with the oxidant stream passing the cathode electrode. Mixed reactant fuel cells direct aqueous alcohol adjacent the cathode electrode along with the gaseous oxidant.

A first major problem of such direct aqueous alcohol fuel cells therefore is that common platinum-based cathode electrodes in the presence of oxygen and alcohol normally oxidize the alcohol, for by example oxidizing methanol in a reaction that produces carbon dioxide and water with the energy of the reaction producing heat instead of electrical energy. Not only would the additional heat reduce the efficiency of the fuel cell by increasing necessary cooling requirements, but also the alcohol is lost as a fuel source to produce electrical energy. To prevent oxidation of alcohol at cathode electrodes in direct aqueous alcohol fuel cells, special cathode electrodes have been developed from catalytic compositions that do not oxidize alcohols such as methanol to a significant degree. Such cathode electrodes for direct aqueous alcohol fuel cells are known in the art and are described as applied to methanol for example in the aforesaid Patent to Van Dine, as well as in an article written by V. Trapp, P. Christensen, and A. Hamnett, entitled "New Catalysts for Oxygen Reduction Based on Transition-Metal Sulfides", and published in J. Chem. Soc., Faraday Trans., 1996, Vol. 92, at Pages 4311–4319. For purposes of consistency, such cathode electrodes that do not oxidize alcohol to a significant degree will be referred to hereinafter as "selective cathode electrodes".

A second problem associated with having aqueous alcohol adjacent the cathode electrodes is that, even if selective electrodes prevent oxidation of the alcohol, it is nonetheless swept into the cathode exhaust stream and thereby removed from the fuel cell. One solution to that problem has been to utilize condensing heat exchangers exposed to ambient air to cool and thereby condense evaporated alcohol and water, and thereafter direct the condensed alcohol and water back into the fuel cell, as disclosed in Van Dine for a split reactant direct aqueous alcohol fuel cell using an aqueous methanol fuel. Such condensing heat exchangers, however, encounter decreasing efficiencies as ambient temperatures increase. Where the power plant is to power a transportation vehicle such as an automobile, the plant will be exposed to an extremely wide range of ambient temperatures. For example where an ambient air coolant stream passes through a heat exchanger, performance of the exchanger in recovering alcohol and water will vary as a direct function of the temperature of the ambient air because decreasing amounts of liquid precipitate out of power plant exhaust streams as the ambient air temperature increases. Additionally, condensing heat exchangers typically require fan apparatus and related manifolding, switching and controls to maintain proper passage of the ambient air through the exchanger, thereby adding weight, cost and complexity to such a fuel cell power plant. Therefore it is desirable to develop a direct aqueous alcohol fuel cell power plant that enhances recovery of alcohol and water in plant exhaust streams while decreasing weight, complexity and cost of the plant.

DISCLOSURE OF THE INVENTION

The invention is an alcohol and water recovery system for a direct aqueous alcohol fuel cell power plant. The system includes at least one direct aqueous alcohol fuel cell for producing electrical energy from alcohol fuel and oxidizing fluid reactants, and a direct alcohol and water transfer device for recovering alcohol and water leaving the plant and transferring the recovered alcohol and water back into the plant. The fuel cell includes an electrolyte that has opposed first and second major surfaces, an anode electrode supported by a porous anode support layer in intimate contact with the first major surface and a selective cathode electrode supported by a porous cathode support layer in intimate contact with the second major surface. The selective cathode electrode does not oxidize alcohol to a significant degree. The alcohol fuel and oxidizing fluid are exposed to the electrolyte to produce electrical energy, and any unused alcohol is directed from the fuel cell in a plant exhaust stream to the direct alcohol and water transfer device.

The direct alcohol and water transfer device passes a process oxidant stream upstream of the plant in mass transfer relationship with the plant exhaust stream that includes any unused alcohol and any water swept from the fuel cell. The process oxidant stream is directed from the direct alcohol and water transfer device to the fuel cell to supply the oxidizing fluid such as air to the fuel cell. In the direct alcohol and water transfer device, the alcohol and water in the plant exhaust stream transfer directly through a mass transfer medium of the transfer device to the process oxidant stream entering the plant. The direct alcohol and water transfer device includes a separator housing for supporting the mass transfer medium in mass transfer relationship with the process oxidant stream and the power plant exhaust streams so that the streams contact the mass transfer medium and the separator housing prevents bulk mixing of the streams. The mass transfer medium may comprise any of a variety of materials for sorbing a fluid substance consisting of polar molecules such as methanol, ethanol, propanol, butanol or pentanol alcohols and/or water molecules from a stream containing fluid substances consisting of polar and non-polar molecules. An exemplary mass transfer medium includes a liquid water portion of a water saturated polyfluorosulfonic ionomer membrane. In a preferred embodiment, the system includes a gas-liquid separator positioned to receive the plant exhaust stream between the fuel cell and the direct alcohol and water transfer device to separate liquid water and/or liquid alcohol and direct the liquid back to a fuel supply of aqueous alcohol fuel.

In use of the alcohol and water recovery system for a direct aqueous alcohol fuel cell power plant, because the alcohol and water transfer directly from the plant exhaust stream into the process oxidant stream entering the power plant, a rate of recovery of alcohol and water is not solely a function of ambient air temperature, but instead is a function of partial pressure differences between mass in the oxidant stream entering the power plant and mass in the plant exhaust stream exiting the plant. The present invention therefore permits greater alcohol and water recovery than is possible with a plant using an ambient air cooled condensing heat exchanger which has a recovery rate that is largely a function of ambient temperatures. With the present invention, if ambient air temperature increases, a mass transfer capacity of the direct transfer device remains constant. Additionally, complex, heavy and costly condensing heat exchanger components such as fans, manifolding and related control apparatus are not needed, thereby increasing alcohol and water recovery and energy efficiency of the plant while decreasing weight, volume, complexity and cost. Another advantage of directing recovered alcohol into the process oxidant stream is that alcohol is therefore directed with the process oxidant stream into a cathode side of the cell. That will decrease a rate of alcohol cross-over from the anode to the cathode side of the fuel cell because the rate of alcohol crossover is primarily a function of relative concentrations of alcohol in the anode and cathode sides of the electrolyte. Therefore less unused alcohol will be transferred from the anode side to the cathode side of the cell to be swept out of the cell in the plant exhaust stream.

Accordingly, it is a general object of the present invention to provide an alcohol and water recovery system for a direct aqueous alcohol fuel cell power plant that overcomes deficiencies of prior art fuel cell power plants.

It is a more specific object to provide an alcohol and water recovery system for a direct aqueous alcohol fuel cell power plant that improves rates of recovery of alcohol and water over a broad range of operating conditions.

It is yet another object to provide an alcohol and water recovery system for a direct aqueous alcohol fuel cell power plant that returns to the plant alcohol and water exiting the plant without utilizing a condensing heat exchanger.

It is still a further object to provide an alcohol and water recovery system for a direct aqueous alcohol fuel cell power plant that directly transfers alcohol and water exiting the power plant back into a plant process oxidant stream to humidify and heat the oxidant stream and return alcohol to the plant.

It is yet another specific object to provide an alcohol and water recovery system for a direct aqueous alcohol fuel cell power plant that recovers alcohol and water exiting the plant in a plant exhaust stream to provide the recovered alcohol and water to a cathode side of the fuel cell and thereby reduce a rate of alcohol cross-over from an anode side of the cell through a cell electrolyte to the cathode side of the cell.

These and other objects and advantages of this invention will become more readily apparent when the following description is read in conjunction with the accompanying drawing.

DESCRIPTION OF THE PREFERRED EMBODIMENTS

Figure 1:
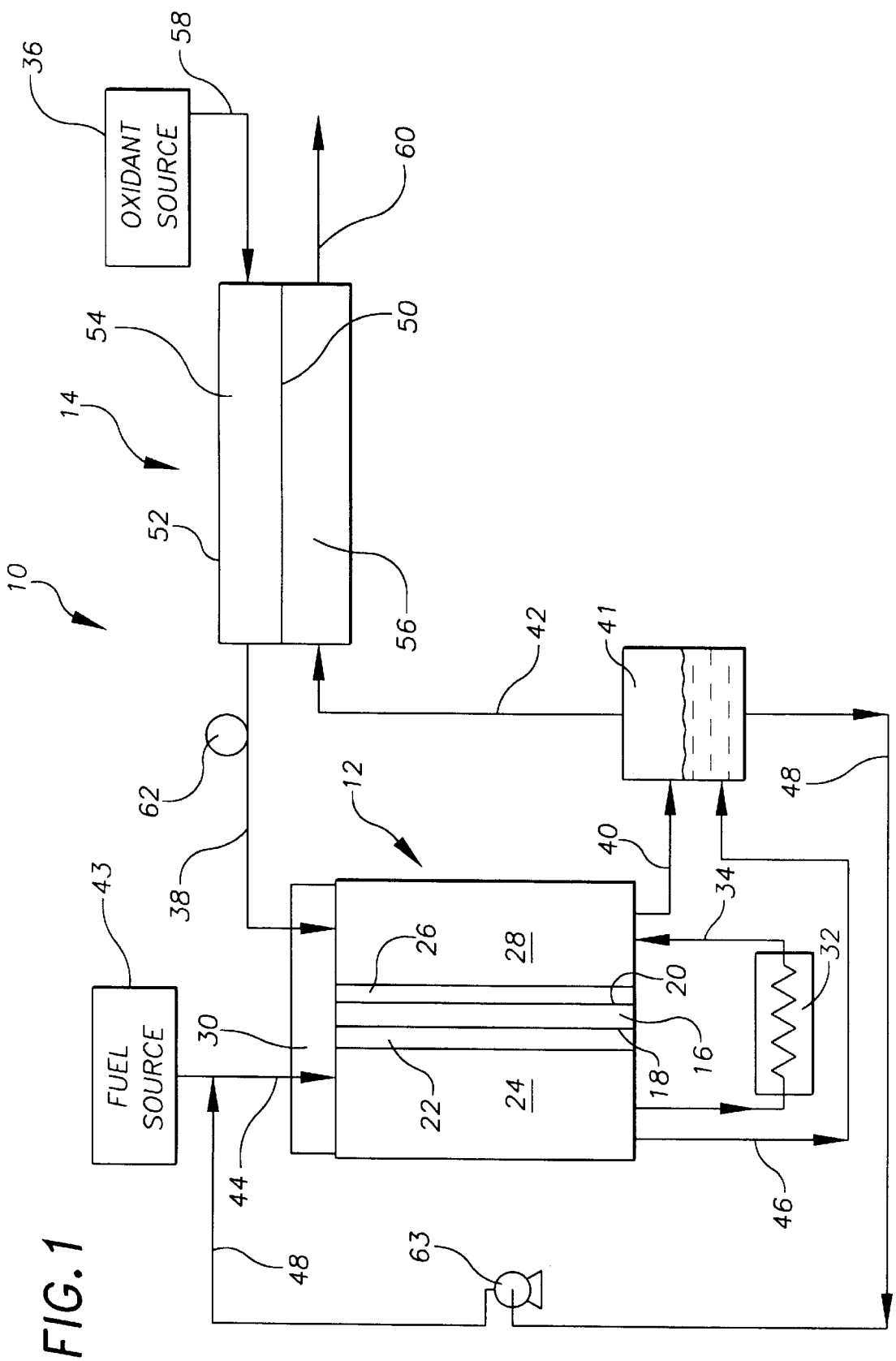
FIG. 1 is a schematic representation of an alcohol and water recovery system for a direct aqueous alcohol fuel cell power plant constructed in accordance with the present invention showing the system applied to a split reactant direct aqueous alcohol fuel cell.

Referring to the drawing in detail, an alcohol and water recovery system for a direct aqueous alcohol fuel cell power plant of the present invention is shown and generally designated by the reference numeral 10. For purposes herein, the phrase "aqueous alcohol" is to be understood to mean a solution or mixture including water and methanol, ethanol, propanol, butanol or pentanol or combinations thereof. The system 10 includes at least one direct aqueous alcohol fuel cell means for producing electrical energy from aqueous alcohol fuel and oxidizing fluid reactants, such as a split reactant fuel cell 12 shown in FIG. 1, and a direct alcohol and water transfer device 14. The split reactant fuel cell 12 includes a proton exchange membrane ("PEM") electrolyte 16 having a first major surface 18 and an opposed second major surface 20; an anode electrode 22 supported by a porous anode support layer 24 in intimate contact with the first major surface 18 of the electrolyte 16; and, a selective cathode electrode 26 that does not oxidize alcohol to a significant degree that is supported by a porous cathode support layer 28 in intimate contact with the second major surface 20 of the electrolyte 16. The anode and cathode porous support layers 24, 28 may be formed of porous or channeled graphite, carbon or metal sheets. The fuel cell 12 may be combined with other virtually identical fuel cells in a well-known manner to form a stack. As is common in the art, the fuel cell 12 may be enclosed within a frame or structure 30 that defines manifolds for directing streams of the aqueous alcohol fuel and oxidant reactants and product fluids into and out of the cell, and the structure 30 also includes electrical conduction means for directing an electrical current generated by the fuel cell out of the cell 12 to an electricity using device 32, such as through a standard external load circuit 34 to thereby perform as a power plant in a well-known manner.

A process oxidant or oxidant inlet stream such as air is directed from an oxidant source 36 into the split reactant fuel cell 12 through an oxidant inlet passage 38 that passes a stream of oxidant into the porous cathode support layer 28 so that the oxidant passes in contact with the selective cathode electrode 26 to provide oxidant to the electrode 26 for facilitating an electrochemical reaction at the selective cathode electrode and for sweeping into the oxidant stream by evaporation and/or entrainment water formed at the cathode electrode 26 as well as any alcohol and/or water carried through the electrolyte 16 from the anode electrode 22 or any humidification water in the oxidant stream. The process oxidant stream then passes out of the cathode support layer 28 as a cathode exhaust stream within a cathode exhaust passage 40 and may then be optionally directed into and through a gas-liquid separator means for separating a gaseous portion of the cathode exhaust stream from a liquid portion of the gas stream, such as a standard gravity gas-liquid separator 41. The separated gaseous portion of the cathode exhaust stream is then directed as a plant exhaust stream through a plant exhaust passage 42 into the direct alcohol and water transfer device.

An aqueous alcohol fuel stream is directed from a fuel storage source 43 (labelled "FUEL SOURCE" in FIGS. 1 and 2 for convenience) through a fuel inlet line 44 into the porous anode support layer 24 so that the aqueous alcohol fuel comes into contact with the anode electrode 22. In a well-known manner, the alcohol such as methanol electrochemically reacts at the anode electrode to produce protons and electrons and carbon dioxide, wherein the electrons flow through the external load circuit 34 to power the electrical device 32 such as electric motors powering a transport vehicle, while the protons travel through the electrolyte 16 to the selective cathode electrode 26. The electrons then continue through the circuit 34 to the selective cathode electrode where they react with the oxidant to form water and heat. The aqueous alcohol fuel stream is directed from the porous support layer 24 out of the split reactant fuel cell 12 as an anode exhaust stream within an anode exhaust passage 46 to the gravity gas-liquid separator 41, wherein gaseous portions of the anode exhaust stream enter the plant exhaust stream and are directed within the plant exhaust passage 42 to the direct alcohol and water recovery device 14, and liquid portions of the anode exhaust stream are separated in well-known manner and directed as return fuel in a return fuel line 48 that directs the return fuel into the fuel inlet line 44 and back into the porous anode support layer, as shown in FIG. 1.

The direct alcohol and water transfer device 14 is secured in fluid communication with both the oxidant inlet passage 38 and the plant exhaust passage 42. The direct alcohol and water transfer device 14 includes a mass transfer medium means 50 for sorbing a fluid substance consisting of polar molecules within a first fluid stream containing fluid substances consisting of polar and nonpolar molecules, such as a stream including methanol, ethanol, propanol, butanol or pentanol alcohols, water vapor and/or entrained liquid moisture (being fluid substances consisting of polar molecules), air and carbon dioxide (being fluid substances consisting of non-polar molecules), and for desorbing the sorbed fluid into a second stream having a lower proportion of the fluid substance consisting of polar molecules than the first stream. Exemplary mass transfer medium means include a liquid water portion of an ion exchange resin or an ionomeric membrane such as a water saturated polyfluorosulfonic ionomer membrane sold under the brand name "NAFION" by the E.I. DuPont company of Willmington, Del., U.S.A., or a liquid water portion of tubes made of the aforesaid "NAFION" membrane and sold under the brand name "ME-SERIES MOISTURE EXCHANGERS" by the Perma Pure, Inc. company of Toms River, N.J., U.S.A. An additional mass transfer medium includes a desiccant material capable of sorbing moisture such as alcohol and water vapor from a gaseous stream and capable of desorbing the alcohol and water into a gaseous stream such as finely powdered solid, crystalline alkali metal or alkaline earth metal compounds including active carbons, silica gel, activated aluminas and zeolites as described in more detail at Column 5, line 9 to Column 6, line 17 in U.S. Pat. No. 5,542,968 issued on Aug. 6, 1996 to Belding et al., which patent is hereby incorporated herein by reference.

The direct alcohol and water transfer device 14 also includes a separator housing means 52 for supporting the mass transfer medium means 50 in mass transfer relationship with the plant exhaust stream and the process oxidant stream so that both streams contact the mass transfer medium means and the separator housing means prevents bulk mixing of the plant exhaust and process oxidant streams. Exemplary separator housing means may include an enclosure (shown schematically in FIGS. 1 and 2 at reference number 52) that supports the mass transfer medium means 50 between an inlet chamber 54 and an exhaust chamber 56. The process oxidant stream passes from the oxidant source 36 through an oxidant feed line 58 into and through the inlet chamber 54 into the oxidant inlet passage 38, while the plant exhaust stream passes from the plant exhaust passage 42 into and through the exhaust chamber 56 to leave the plant 10 through a plant discharge vent 60 in fluid communication with the exhaust chamber 56. Additional separator housing means 52 may include more complicated enclosures structured to enhance exposure of the process oxidant and plant exhaust streams to the mass transfer medium means while preventing bulk mixing of the streams such as enclosures common in known fluid to fluid heat exchanger art. An additional and cooperative aspect of the separator housing means 52 includes membrane portions supporting liquid water portions in the aforesaid "NAFION" membrane materials and tube portions supporting liquid water in the aforesaid "NAFION"-based tubes that are sold under the brand name "ME-SERIES MOISTURE EXCHANGERS" by Perma Pure, Inc. In such a separator housing means 52, "NAFION"-based mass transfer medium means will selectively transfer fluid substances consisting of polar molecules such as methanol, ethanol, propanol, butanol, or pentanol alcohols, water vapor or entrained liquid moisture from a side of the membrane having a greatest concentration of the fluid substances consisting of polar molecules to a side having a lesser concentration in a manner well-known in the art.

A further exemplary separator housing means includes an enthalpy wheel that supports the aforesaid desiccant mass transfer medium means in a rotational disposition between a moisture laden plant exhaust stream and a dry process oxidant stream, as described in more detail at Column 4, line 35 to Column 5, line 4 and generally throughout the aforesaid U.S. Pat. No. 5,542,968. The wheel includes a plurality of open ended passages running generally parallel to an axis of rotation of the wheel, wherein the passages are typically formed by winding a flat sheet of corrugated paper board including the mass transfer medium desiccant around a central hub of the wheel until a multi-layered media is built up that extends to an outer housing of a cassette supporting the wheel. Such enthalpy wheels are well-known in building air-conditioning arts, as further described in U.S. Pat. No. 5,660,048 that issued on Aug. 26, 1997 to Bedding et al. and is incorporated herein by reference. As a separator housing means, the enthalpy wheel would be supported to rotate about an axis parallel to flow through the inlet and exhaust chambers 54, 46 so that the plant exhaust stream passes through about one-half of the wheel while simultaneously the process oxidant stream passes through the other half of the wheel. The mass transfer medium means desiccant on a first portion of the wheel within the exhaust chamber 56 would thereby sorb a fluid substance consisting of polar molecules such as methanol, ethanol, propanol, butanol or pentanol alcohols, water vapor or entrained liquid moisture from the plant exhaust stream and, when the wheel rotates to position that first portion of the wheel into the inlet chamber 54, if the concentration of the fluid substance consisting of polar molecules within the inlet oxidant stream is less that the concentration of the fluid substance consisting of fluid molecules within the plant exhaust stream, the sorbed polar molecule fluid substance held by the desiccant would be desorbed into the process oxidant stream to add alcohol and water to the process oxidant stream, thereby also humidifying and heating the oxidant stream. Gaseous carbon dioxide within the plant exhaust stream would not be sorbed by the mass transfer medium and would therefore pass out of the direct alcohol and water transfer device 14 within the plant discharge vent 60.

As shown in FIG. 1, the alcohol and water recovery system 10 for a direct aqueous alcohol fuel cell power plant may also include a blower 62 positioned on the oxidant inlet passage 38 to variably accelerate flow of gaseous oxidant into the plant 10. Optionally, the blower 62 may be positioned along the oxidant feed line 58 for the same purposes. The system 10 may also include a fuel circulating pump 63 for circulating the aqueous alcohol fuel positioned for example on the return fuel line 48.

Figure 2:
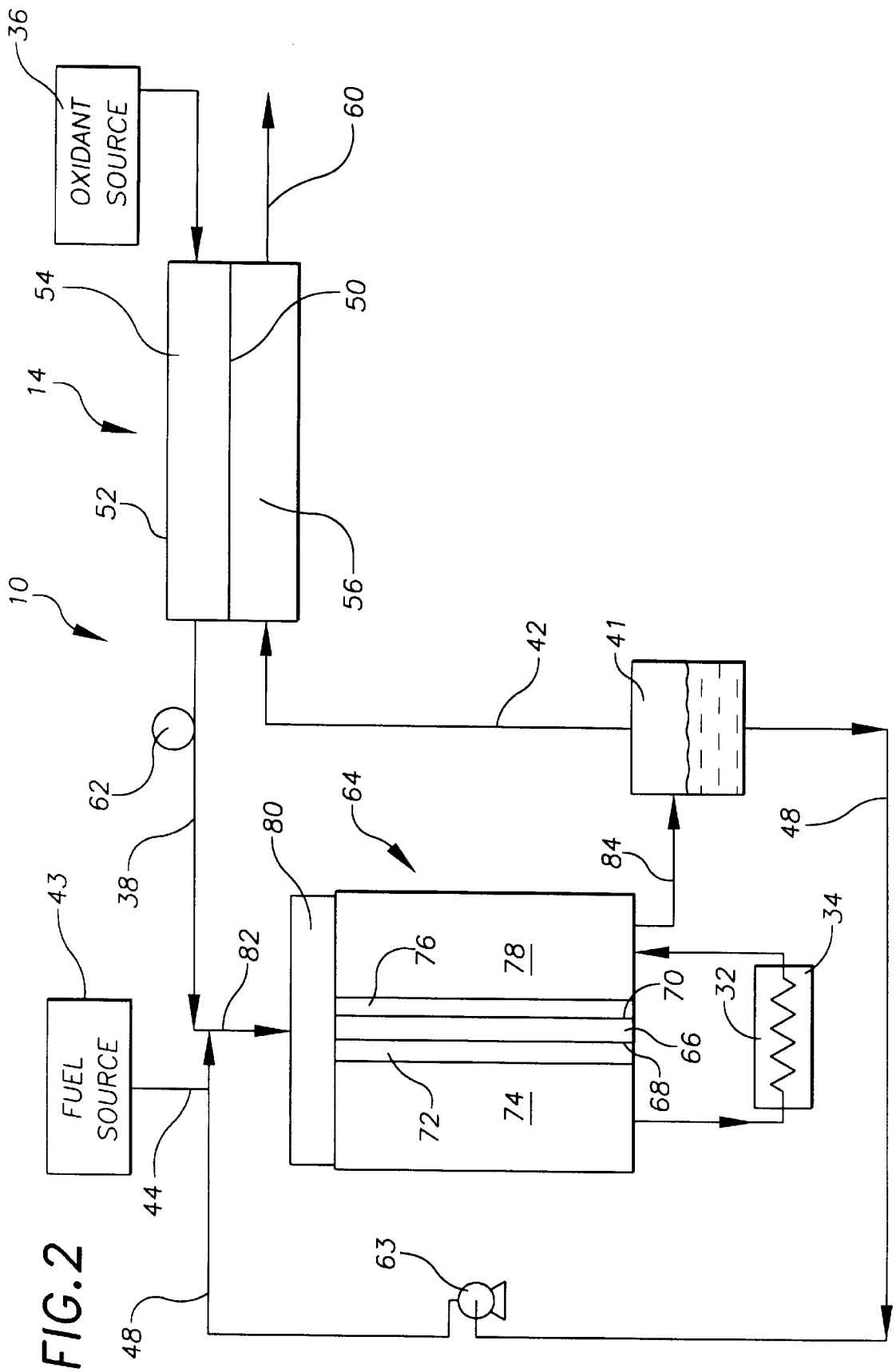
FIG. 2 is a schematic representation of the FIG. 1 alcohol and water recovery system for a direct aqueous alcohol fuel cell power plant, showing the system applied to a mixed reactant direct aqueous alcohol fuel cell.

As shown schematically in FIG. 2, the direct aqueous alcohol fuel cell means may also include a mixed reactant fuel cell 64 for producing electrical energy from the aqueous alcohol fuel and oxidizing fluid reactants. In FIG. 2, the same components of the alcohol and water recovery system 10 for a direct aqueous alcohol fuel cell power plant that have virtually identical configurations have the same reference numeral in FIG. 2 that they have in FIG. 1, including the direct alcohol and water recovery device 14, and its separator housing means 52, mass transfer medium means 50, and inlet and exhaust chambers 54, 56, the oxidant source 36, oxidant inlet passage 38, aqueous alcohol fuel storage source 43, fuel inlet line 44, gas-liquid separator 41, plant exhaust passage 42, return fuel line 48, blower 62, fuel circulating pump 63, and load circuit 34 to an electricity using device 32.

The mixed reactant fuel cell 64 includes components well-known in the art as referred to above, many of which are similar to components having comparable functions in the split reactant fuel cell 12. For convenience herein and to avoid an inference that the mixed reactant fuel cell 64 components are identical to those components in the split reactant fuel cell having the same function, components of the mixed reactant fuel cell 64 that are similar to components of the split reactant fuel cell 12 will be described with a prefix "MR". The mixed reactant fuel cell 64 includes a MR proton exchange membrane ("PEM") electrolyte 66 having a first major surface 68 and an opposed second major surface 70; an MR anode electrode 72 supported by a MR porous anode support layer 74 in intimate contact with the first major surface 68 of the MR electrolyte 66; and, a MR selective cathode electrode 76 that does not oxidize alcohol to a significant degree that is supported by a MR porous cathode support layer 78 in intimate contact with the second major surface 70 of the MR electrolyte 66. The MR anode and MR cathode porous support layers 74, 78 may be formed of porous or channeled graphite, carbon or metal sheets, as with the split reactant fuel cell 12. The mixed reactant fuel cell 64 may be combined with other virtually identical fuel cells in a well-known manner to form a stack of cells in a series, or alternatively as an arrangement of strip cells, as described in the and article written by R. Nolte, A. Kolbe, K. Ledjeff-Hey entitled "High Voltage—Small Current Fuel Cell Concept Based on Functional Membranes", published in "Proceedings of the 37th Power Sources Conference, Jun. 17–20, 1996", at pages 77–80. As is common in the art, the mixed reactant fuel cell 64 may be enclosed within a frame or structure 80 that defines manifolds for directing streams of the aqueous alcohol fuel and oxidant reactants and product fluids into and out of the cell 64, and the structure 80 also includes electrical conduction means for directing an electrical current generated by the fuel cell out of the cell 64 to an electricity using device 32, such as through a standard external load circuit 34.

The mixed reactant fuel cell 64 also includes a mixed reactant inlet passage 82 in fluid communication with the oxidant inlet passage 38 and the fuel inlet line 44 that directs the mixed aqueous alcohol fuel reactant and oxidant stream reactant together and directs the mixed reactants into the MR anode support layer 74 and MR cathode support layer 78. A mixed reactant cell exhaust passage 84 directs the mixed reactants passing out of both the MR anode support layer 74 and MR cathode support layer 78 together as a mixed reactant cell exhaust stream optionally into the gas-liquid separator 41, wherein liquid portions of the mixed reactant cell exhaust stream are directed into the return fuel line 48, and gaseous portions of the mixed reactant cell exhaust stream are directed into the plant exhaust passage 42 as a plant exhaust stream and are then passed into the direct alcohol and water recovery device 14. Within the direct alcohol and water recovery device 14, the gaseous portions of the mixed reactant cell exhaust stream are processed by the device 14 in the same manner as described above for split reactant fuel cell 12.

In use of the alcohol and water recovery system 10 for a direct aqueous alcohol power plant, because the alcohol and water from the plant exhaust stream are recovered directly into the process oxidant stream through the mass transfer medium means 50 without usage of a condensing heat exchanger, a rate of recovery of the alcohol and water is not a function of ambient air conditions. Additionally, the direct alcohol and water transfer device selectively restricts transfer of carbon dioxide from the plant exhaust stream into the process oxidant stream entering the stream, thereby enriching the process oxidant stream with alcohol, humidifying moisture and heat without gaseous carbon dioxide. Further, because the process oxidant stream directed through the cathode support layers 28, 78 of the direct aqueous alcohol fuel cell means by the alcohol and water recovery system 10 is enriched with the recovered alcohol, a rate of cross-over of the alcohol fuel from an anode side of the fuel cells within the anode support layers 24, 74 to a cathode side of the fuel cells within the cathode support layers 28, 78 is lessened, thereby further enhancing efficiency of fuel utilization within the alcohol and water recovery system 10 for a direct aqueous alcohol fuel cell power plant.

While the present invention has been described and illustrated with respect to a particular construction and method of use of the alcohol and water recovery system for a direct aqueous alcohol fuel cell power plant, it is to be understood that the present invention is not to be limited to the described and illustrated embodiments. For example, while reference has been made to split and mixed reactant direct aqueous alcohol fuel cell power plants, the system may be applied to any fuel cell power plant utilizing aqueous alcohol as a fuel. Accordingly, reference should be made primarily to the following claims rather than the foregoing description to determine the scope of the invention.

What is claimed is:

1. An alcohol and water recovery system for a direct aqueous alcohol fuel cell power plant that generates electrical energy from aqueous alcohol fuel and oxidant fluid reactants, the system comprising:
   a. at least one direct aqueous alcohol fuel cell means for producing the electrical energy from the aqueous alcohol fuel and oxidant fluid reactants;
   b. an oxidant inlet passage that passes a process oxidant stream into the direct aqueous alcohol fuel cell means, and a fuel inlet line that directs an aqueous alcohol fuel stream from a supply of aqueous alcohol fuel into the direct aqueous alcohol fuel cell means;
   c. a plant exhaust passage that receives a plant exhaust stream of the aqueous alcohol fuel and process oxidant streams that have passed through the direct aqueous alcohol fuel cell means; and,
   d. a direct alcohol and water transfer device secured in fluid communication with the oxidant inlet passage and with the plant exhaust passage, including;
      i. a mass transfer medium means for sorbing a fluid substance consisting of polar molecules within the plant exhaust stream and for desorbing the fluid substance consisting of polar molecules into the process oxidant stream that has a lower proportion of the fluid substance consisting of the polar molecules than the plant exhaust stream; and
      ii. a separator housing means for supporting the mass transfer medium means in mass transfer relationship with the plant exhaust stream and process oxidant stream so that both streams contact the mass transfer medium means, and for preventing bulk mixing of the plant exhaust and process oxidant streams.

2. The system of claim 1, wherein the mass transfer medium means comprises a liquid water portion of an ionomeric membrane.

3. The system of claim 2, wherein the separator housing means comprises membrane portions supporting the liquid water of the ionomeric membrane.

4. The system of claim 1, wherein the mass transfer medium means comprises a liquid water portion of ionomeric membrane tubes.

5. The system of claim 4, wherein the separator housing means comprises tube portions supporting the liquid water in the ionomeric membrane tubes.

6. The system of claim 1, wherein the mass transfer medium means comprises a desiccant material capable of sorbing alcohol and water from a gaseous stream and capable of desorbing the sorbed alcohol and water into a gaseous stream.

7. The system of claim 6, wherein the separator housing means comprises an enthalpy wheel supporting the desiccant material in a plurality of passages running generally parallel to an axis of rotation of the enthalpy wheel and the enthalpy wheel is rotationally supported within inlet and exhaust chambers of the separator housing so that the wheel rotates about an axis parallel to flow of the process oxidant stream through the inlet chamber and the plant exhaust stream through the exhaust chamber to directly transfer the sorbed alcohol and water from the exhaust stream to the process oxidant stream.

8. The system of claim 1, further comprising a gas-liquid separator means in fluid communication with the plant exhaust passage and the aqueous alcohol fuel and process oxidant streams that have passed through the direct aqueous alcohol fuel cell means for separating gaseous and liquid portions of the streams and directing the gaseous portions into the plant exhaust passage and directing the liquid portions into the fuel inlet line.

9. An alcohol and water recovery system for a direct aqueous alcohol fuel cell power plant that generates electrical energy from aqueous alcohol fuel and oxidant fluid reactants, the system comprising:
   a. at least one direct aqueous alcohol fuel cell for producing the electrical energy from the aqueous alcohol fuel and oxidant fluid, the fuel cell including;
      i. a proton exchange membrane electrolyte having a first major surface and an opposed second major surface; and
      ii. an anode electrode supported by a porous anode support layer in intimate contact with the first major surface of the electrolyte and a selective cathode electrode supported by a porous cathode support layer in intimate contact with the second major surface of the electrolyte;
   b. an oxidant inlet passage that passes a process oxidant stream into the direct aqueous alcohol fuel cell, and a fuel inlet line that directs an aqueous alcohol fuel stream from a supply of aqueous alcohol fuel into the direct aqueous alcohol fuel cell;
   c. a plant exhaust passage that receives a plant exhaust stream of the aqueous alcohol fuel and process oxidant streams that have passed through the direct aqueous alcohol fuel cell; and,
   d. a direct alcohol and water transfer device secured in fluid communication with the oxidant inlet passage and with the plant exhaust passage, the device including;
      i. a mass transfer medium means for sorbing a fluid substance consisting of polar molecules within the plant exhaust stream and for desorbing the fluid substance consisting of polar molecules into the process oxidant stream that has a lower proportion of the fluid substance consisting of the solar molecules than the plant exhaust stream; and
      ii. a separator housing means for supporting the mass transfer medium means in mass transfer relationship with the plant exhaust stream and process oxidant stream so that both streams contact the mass transfer medium means, and for preventing bulk mixing of the plant exhaust and process oxidant streams.

10. The system of claim 9, wherein the direct aqueous alcohol fuel cell further comprises a split reactant fuel cell.

11. The system of claim 10, wherein the mass transfer medium means comprises a liquid water portion of an ionomeric membrane and the separator housing means comprises membrane portions supporting the liquid water of the ionomeric membrane.

12. The system of claim 10, wherein the mass transfer medium means comprises a liquid water portion of ionomeric membrane tubes and the separator housing means comprises tube portions supporting the liquid water in the ionomeric membrane tubes.

13. The system of claim 10, wherein the mass transfer medium means comprises a desiccant material capable of sorbing alcohol and water from a gaseous stream and capable of desorbing the sorbed alcohol and water into a gaseous stream.

14. The system of claim 13, wherein the separator housing means comprises an enthalpy wheel supporting the desiccant material in a plurality of passages running generally parallel to an axis of rotation of the enthalpy wheel and the enthalpy wheel is rotationally supported within inlet and exhaust chambers of the separator housing so that the wheel rotates about an axis parallel to flow of the process oxidant stream through the inlet chamber and the plant exhaust stream through the exhaust chamber to directly transfer the sorbed alcohol and water from the plant exhaust stream to the process oxidant stream.

15. The system of claim 9, wherein the direct aqueous alcohol fuel cell further comprises a mixed reactant fuel cell.

16. The system of claim 15, wherein the mass transfer medium means comprises a liquid water portion of an ionomeric membrane and the separator housing means comprises membrane portions supporting the liquid water of the ionomeric membrane.

* * * * *